US009316239B2

(12) United States Patent
Van Wijk

(10) Patent No.: US 9,316,239 B2
(45) Date of Patent: Apr. 19, 2016

(54) HYDRAULIC CONTROL SYSTEM IN A CONTINUOUSLY VARIABLE TRANSMISSION

(75) Inventor: Wilhelmus Johannes Maria Van Wijk, Udenhout (NL)

(73) Assignee: BOSCH TRANSMISSION TECHNOLOGY B.V., Tilburg (NL)

( * ) Notice: Subject to any disclaimer, the term of this patent is extended or adjusted under 35 U.S.C. 154(b) by 356 days.

(21) Appl. No.: 13/993,461

(22) PCT Filed: Dec. 14, 2011

(86) PCT No.: PCT/NL2011/000080
§ 371 (c)(1),
(2), (4) Date: Jun. 12, 2013

(87) PCT Pub. No.: WO2012/081973
PCT Pub. Date: Jun. 21, 2012

(65) Prior Publication Data
US 2013/0263586 A1 Oct. 10, 2013

(30) Foreign Application Priority Data
Dec. 15, 2010 (NL) .................................... 1038450

(51) Int. Cl.
*F16H 61/662* (2006.01)
*F15B 21/00* (2006.01)
(52) U.S. Cl.
CPC .......... *F15B 21/00* (2013.01); *F16H 61/66272* (2013.01); *F16H 2061/66286* (2013.01)

(58) Field of Classification Search
CPC ............... F16H 61/66276; F16H 2061/66286; F16H 61/66272
See application file for complete search history.

(56) References Cited

U.S. PATENT DOCUMENTS

| 5,169,366 | A  | * | 12/1992 | Reniers ........................ 474/28 |
| 6,306,061 | B1 |   | 10/2001 | Inamura et al. |
| 6,508,735 | B1 |   | 1/2003  | Murakami et al. |
| 8,096,906 | B2 |   | 1/2012  | Inoue et al. |

FOREIGN PATENT DOCUMENTS

| DE | 100 49 562  | 4/2001  |
| EP | 0 881 415   | 12/1998 |
| EP | 1 939 503   | 7/2008  |
| WO | 2006/016797 | 2/2006  |

OTHER PUBLICATIONS

International Search Report dated Mar. 26, 2012, corresponding to PCT/NL2011/000080.

* cited by examiner

*Primary Examiner* — F. Daniel Lopez
(74) *Attorney, Agent, or Firm* — Young & Thompson

(57) ABSTRACT

A hydraulic control system in a continuously variable transmission (2) is provided with a pump (40) for supplying hydraulic fluid, a main line (41), a line pressure valve (V3), an auxiliary line (42) and a auxiliary pressure valve (V9). The line pressure valve (V3) being arranged to control a line pressure LP in the main line (41) by discharging a surplus of hydraulic fluid supplied by the pump (40) into the auxiliary line (42). The auxiliary pressure valve (V9) is arranged to variably control auxiliary pressure AP in the auxiliary line (41), preferably in dependence on the line pressure LP in the main line (41).

10 Claims, 4 Drawing Sheets

HYDRAULIC CONTROL SYSTEM IN A CONTINUOUSLY VARIABLE TRANSMISSION

BACKGROUND OF THE INVENTION

1. Field of the Invention

Figure 1:
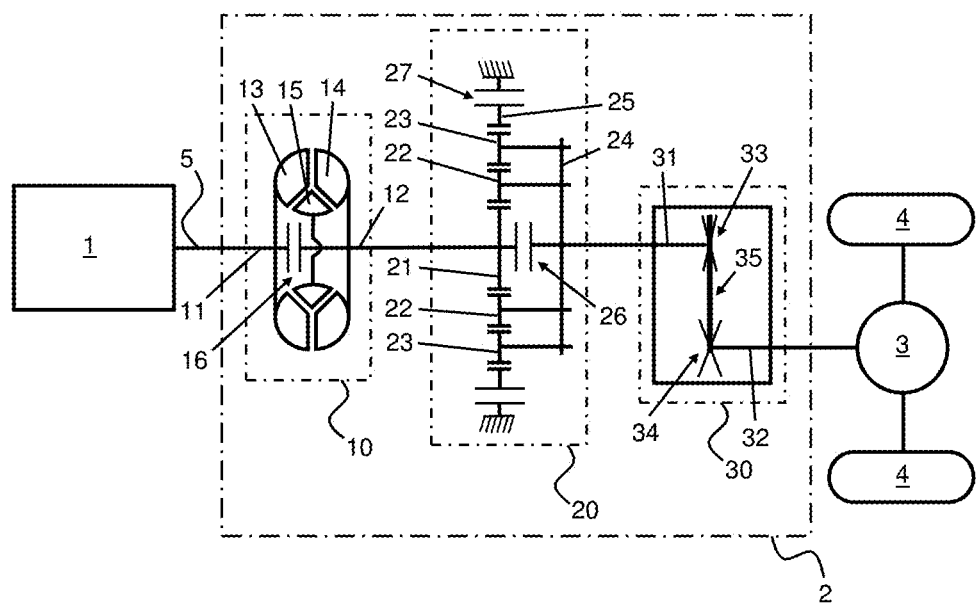

The present invention relates to a hydraulic control system in a continuously variable transmission as defined in the preamble of the following claim 1, in particular for use in a motor vehicle.

2. Description of the Related Art

Such a control system and transmission are known, for example from the European patent publication EP 1 939 503 A. The known continuously variable transmission includes a variator unit with a primary or drive variable pulley and with a secondary or driven variable pulley, as well as an endless flexible transmission element or drive belt, which may be one of several known types, wrapped around and in frictional contact with the said pulleys. The transmission further includes at least one clutch for engaging the transmission, i.e. for enable torque to be transmitted from an input shaft of the transmission to an output shaft thereof. Typically, the said clutch is part of an epicyclic or planetary gearing with one or more clutches and/or brakes for respectively engaging forward (drive) and reverse (drive), which gearing is also referred to as a DNR-set (Drive-Neutral-Reverse-set). Often, the transmission also includes a torque converter for amplifying a drive torque, in particular during the initial acceleration of the motor vehicle from standstill. The known torque converter is typically provided with a lock-up clutch that is engaged, i.e. closed sometime after the said initial acceleration to improve the transmission efficiency.

The transmission provides a speed ratio between the primary and secondary pulleys that may be controlled to an arbitrary value within a range of speed ratios covered by the transmission through an appropriate actuation of the said pulleys by means of the control system of the transmission. More in particular, each pulley comprises two sheaves where between the drive belt is held and whereof one sheave is arranged axially moveable along a respective pulley shaft, energized by the control system. To this end, the known control system includes two pressure cylinders, each associated with a respective one of the said moveable pulley sheaves. Further, the control system includes a primary valve for realizing, in a controlled manner, a pressure level in the pressure cylinder associated with the primary pulley and a secondary valve for realizing, in a controlled manner, a pressure level in the pressure cylinder associated with the secondary pulley. These cylinder pressures determine the clamping forces respectively exerted on the drive belt between the sheaves of each pulley and as a consequence the said speed ratio, as well as the torque that can be transmitted by the transmission.

The control system also includes a pump for supplying the control system with a flow of hydraulic fluid to a main line of the control system. The hydraulic pressure in the main line, i.e. the line pressure, is regulated by means of a controllable line pressure valve of the control system. From this main line the said pressure cylinders are fed with hydraulic fluid under the control of the said primary and secondary valves.

Any surplus of the pump flow is discharged by the line pressure valve into an auxiliary line of the control system, wherefrom said at least one clutch of the transmission can be supplied with hydraulic fluid for the selective engagement, i.e. closing, thereof. The hydraulic pressure in the auxiliary line, i.e. the auxiliary pressure, is set by means of an auxiliary pressure valve of the control system to a pre-determined, i.e. fixed level that is sufficient for engaging the clutch to the extent that it is capable of transmitting the maximum torque to be transmitted. Typically, an auxiliary pressure level of around 12 bar is required for this purpose, as compared 9 to a maximum line pressure level somewhere in the range from 25 to 80.

Because of this known arrangement of the control system, wherein the auxiliary line is located downstream of the main line, the line pressure is controlled to be higher than or at least equal to the auxiliary pressure at all times. According to the present invention this known arrangement comes with the disadvantage that the cylinder pressures required for transmitting the torque to be transmitted can be lower than the auxiliary pressure, but that the line pressure can not. More in particular, it is generally true that the cylinder pressures are dependent on both the torque to be transmitted and on the transmission ratio, whereas the clutch engagement pressure is primarily dependent on the torque to be transmitted. In other words, in certain operating conditions of the transmission, in particular in an accelerating transmission speed ratio and/or at a low torque to be transmitted, the line pressure level that would, theoretically, be required for generating the cylinder pressures is lower than the line pressure level that is actually required for generating the said fixed auxiliary pressure level.

SUMMARY OF THE INVENTION

The present invention aims to overcome said disadvantage, as a result whereof the energy efficiency of the known control system and of the transmission, wherein such known system is applied, may be improved by allowing the line pressure to be reduced to below the said actually required level thereof. According to the invention this aim may be realized by making the auxiliary pressure level variable, i.e. by providing the control system with a controllable auxiliary pressure valve. At least in the said certain operating conditions, the auxiliary pressure and thus the said actually required line pressure can be lowered to, or at least towards, the said theoretically required line pressure.

Preferably, the auxiliary pressure is made variable in dependence on the line pressure, for example by controlling the auxiliary pressure valve in dependence on the line pressure level. Such feedback control can be realized electronically, or by allowing the line pressure to physically act on the auxiliary pressure valve. Preferably such dependency between the auxiliary pressure and line pressure is proportional, more preferably linearly proportional. In more detailed embodiment the dependency of the auxiliary pressure on the line pressure is maintained only until the auxiliary pressure reaches a limit level, preferably a predefined limit level in the range between 10 to 15 bar. This latter feature prevents that the auxiliary pressure level becomes unnecessarily high at a high line pressure level, due to the said (proportional) dependency there between to enable the line pressure level—and hence the auxiliary pressure level—to be lowered Moreover, the dependency of the clutch engagement pressure on the torque to be transmitted is.

BRIEF DESCRIPTION OF THE DRAWING FIGURES

Figure 2:
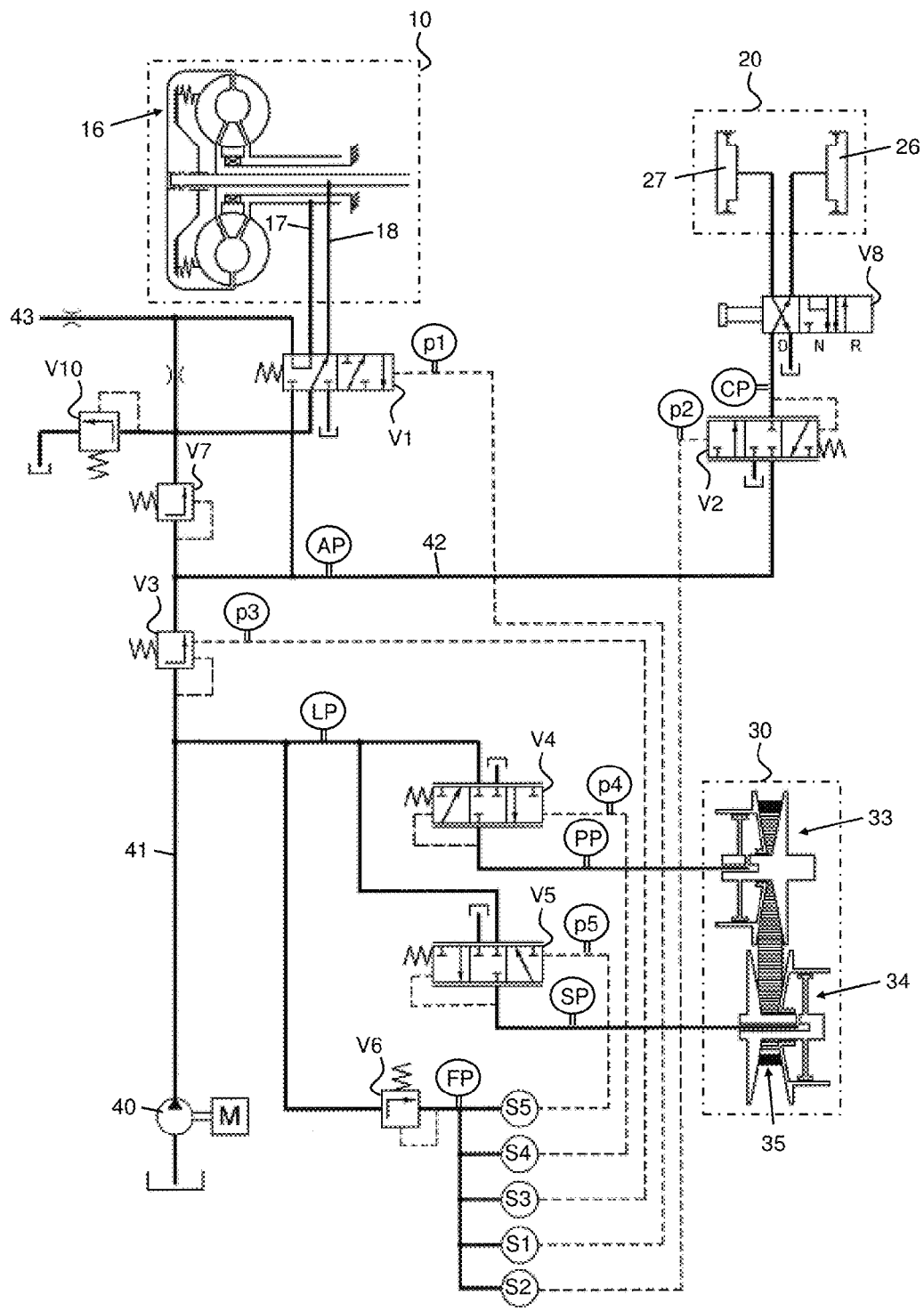
Figure 3:
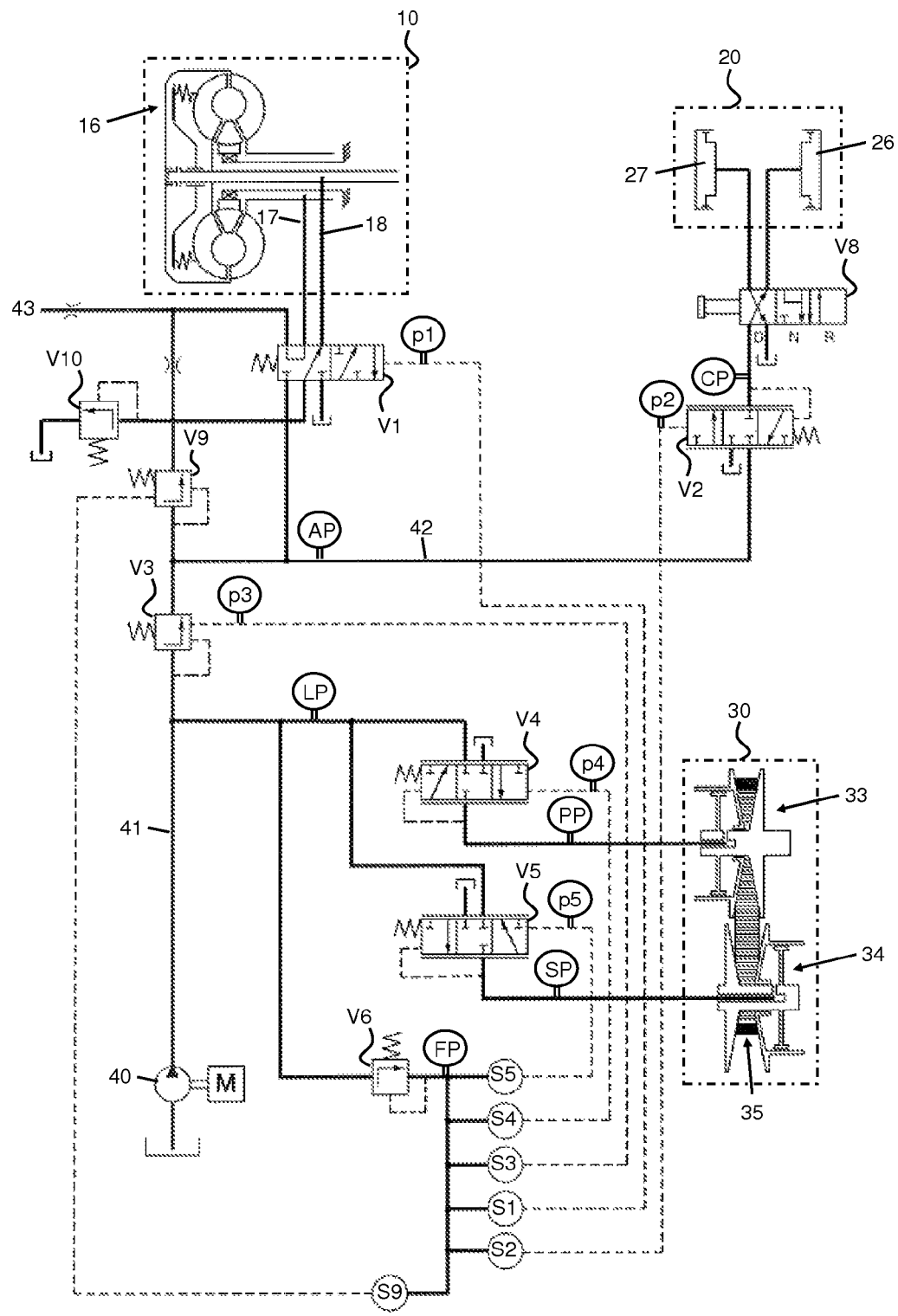
Figure 4:
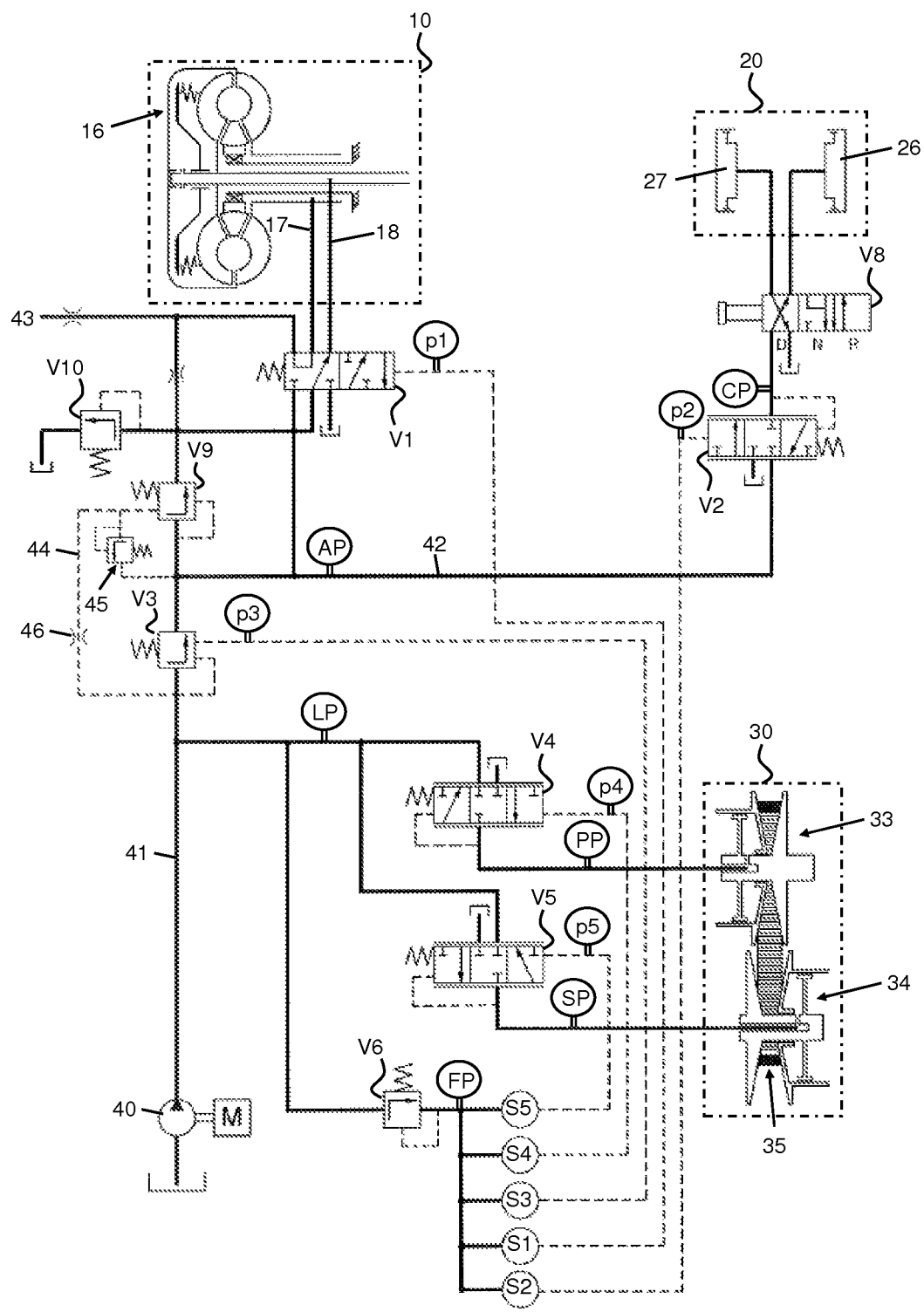

The invention will now be elucidated further along a drawing in which:

FIG. 1 is a schematic representation of the known continuously variable transmission, FIG. 2 is a diagrammatic representation of the known control system as part of a schematically depicted continuously variable transmission that is actuated thereby, FIG. 3 diagrammatically illustrates a first possible embodiment of the control system according to the invention, and FIG. 4 diagrammatically illustrates a second possible embodiment of the control system according to the invention.

DETAILED DESCRIPTION OF THE INVENTION

FIG. 1 provides a schematic representation of a continuously variable transmission 2 that is, for example, provided between an engine 1 and the driven wheels 4 of a motor vehicle. The known transmission 2 comprises a torque converter 10 for amplifying a drive torque, in particular during the initial acceleration of the motor vehicle from standstill, a planetary gearing or DNR (Drive-Neutral-Reverse)-set 20 for respectively engaging a forward or a reverse drive mode of the transmission 2 and a variator unit 30 for varying a speed ratio between the engine 1 and the driven wheels 4 of the motor vehicle to an arbitrary value within a range of speed ratios. Typically, also a final drive gear train with a differential gearing 3 is included in the transmission 2.

A crank shaft 5 of the engine 1 is coupled to an ingoing shaft 11 of the torque converter 10 that drives a pump wheel 13 thereof. A turbine wheel 14 of the torque converter 10 drives an outgoing shaft 12 thereof. The torque converter 10 is further provided with a stator 15 and a selectively engageable bridging or lock-up clutch 16 that can be closed to directly couple the ingoing shaft 11 to the outgoing shaft 12 after the initial acceleration of the motor vehicle. The construction, function and operation of the torque converter 10 are otherwise well-known in the art.

In the shown example of the transmission 2, the DNR-set 20 includes a central sun gear 21 that is coupled to the outgoing shaft 12 of the torque converter 10, a ring gear 25 and a number of sets of two planet gears 22, 23 each, the axes whereof carried by a rotatable planet carrier 24 that is coupled to a primary shaft 31 of the variator unit 30. Of each set of two, mutually meshing planet gears 22, 23, a first planet gear 22 is in meshing arrangement with the sun gear 21 and a second planet gear 23 is in meshing arrangement with the ring gear 25. The DNR-set 20 further includes two clutches 26, 27, whereof a first or forward drive clutch 26 can be closed to rotationally couple the sun gear 21 to the planet carrier 24, in which case the outgoing shaft 12 of the torque converter 10 is directly coupled to the primary shaft 31 of the variator unit 30. The second or reverse drive clutch 27 of the DNR-set 20 can be closed to rotationally fix the ring gear 25, in which case the primary shaft 31 of the variator unit 30 is driven by the outgoing shaft 12 of the torque converter 10 via the sun gear 21, the planet gears 22, 23 and the planet carrier 24, however, in a rotationally opposite sense, i.e. in reverse. If both said clutches 26, 27 of the DNR-set 20 are open, the transmission 2 is said to be in neutral, i.e. no drive torque can then be transmitted thereby. The construction, function and operation of the DNR-set 20 and/or other design variants thereof are otherwise well-known in the art.

The variator unit 30 includes a hydraulically actuated primary variable pulley 33 on the primary shaft 31, a hydraulically actuated secondary variable pulley 34 on a secondary shaft 32 and a drive belt 35 that is wrapped around and in frictional contact with both such pulleys 33, 34. The construction, function and operation of the variator unit 30 are otherwise well-known in the art.

The known transmission 2 is provided with an electro-hydraulic control system that is illustrated in more detail, albeit schematically, in FIG. 2. The known control system is equipped with a pump 40 for providing a flow of pressurized hydraulic fluid and several valves V1-V8, some of which are controlled electrically by means of a respective electromagnetic actuator or solenoid S1-S5, whereof a line pressure valve V3 is provided for controlling the pump pressure LP prevailing in a main line 41 of the control system to a desired level in dependency on a respective pilot pressure p3 that is generated by an associated solenoid S3, a primary pressure valve V4 is provided for controlling the primary actuation pressure PP of the primary pulley 33 to a desired level in dependency on a respective pilot pressure p4 that is generated by an associated solenoid S4, a secondary pressure valve V5 is provided for controlling the secondary actuation pressure SP of the secondary pulley 34 to a desired level in dependency on a respective pilot pressure p5 that is generated by an associated solenoid S5, a lock-up switch valve V1 is provided for controlling the opening, respectively closing of the lock-up clutch 16 of the torque converter 10 in dependency on a respective pilot pressure p1 that is generated by an associated solenoid S1, a clutch engagement valve V2 is provided for controlling the opening, respectively closing of the forward, respectively reverse drive clutches 26, 27 of the DNR-set 20 in dependency on a respective pilot pressure p2 that is generated by an associated solenoid S2, a solenoid feed pressure valve V6 is provided for controlling a fixed solenoid feed pressure FP to supply the said solenoids S1-S5 with pressurized hydraulic fluid for generating the respective pilot pressures p1-p5, an auxiliary pressure valve V7 is provided for controlling a fixed auxiliary pressure AP prevailing in an auxiliary line 42 of the control system, wherefrom auxiliary devices of the transmission 2, such as the torque converter 10 and the said clutches 26, 27 of the DNR-set 20, are supplied with fluid via their respective valves V1 and V2, a manual valve V8 is provided for manually selecting either the forward drive clutch 26 or the reverse drive clutch 27 of the DNR-set 20 to be engaged (In FIG. 2 the manual valve V8 is set to selectively engage the forward drive clutch 26 by connecting it to the auxiliary pressure AP via the clutch engagement valve V2), a lubrication pressure valve V10 is provided for controlling a fixed lubrication pressure BP for supplying one or more lubrication points 43 of the transmission with fluid.

Although in FIG. 2 each one of said solenoids S1-S5 controls a respectively associated valve V1-V5 indirectly by means of a respective pilot pressure p1-p5 that is respectively generated by such one solenoid S1-S5, it is also possible that the solenoids S1-S5 act directly on such respectively associated valve V1-V5.

According to the invention it is a disadvantage of the above known control system that the line pressure LP can not be lowered to below the auxiliary pressure AP. The efficiency of the transmission could, however, be improved if the line pressure LP could be lowered even further. Of course, the said DNR-set clutches 26; 27 could be designed to be fully closed already at a relatively low auxiliary pressure AP, but this would hamper the controllability of the engagement thereof and, moreover, require a dedicated and hence more expensive design of the DNR-set 20. In stead, the invention proposes to make the auxiliary pressure AP variable by providing the control system with a controllable auxiliary pressure valve V9, for example by associating a further solenoid S9 therewith as indicated in FIG. 3. This arrangement allows that the auxiliary pressure AP can at all times be controlled to a level that is equal to or lower than the line pressure LP. This allows the line pressure LP to be lowered in response to a lowering of the torque to be transmitted, which improves the efficiency of the transmission. Of course, this also means that the auxiliary pressure AP and thus also the maximum engagement pressure CP of the DNR-set clutches 26, 27, as controlled by the clutch engagement valve V2, are lower than before. However, this latter effect is acceptable, because such low auxiliary pressure level is linked to a low line pressure level, which in turn is linked to a low torque to be transmitted by the said transmission and in particular the DNR-set clutches 26, 27 thereof.

Preferably, in accordance with the invention, the auxiliary pressure valve V9 is controlled in dependence on the line pressure LP, for example by allowing the line pressure pilot pressure p3 to also act on the auxiliary pressure valve V9. Alternatively, as illustrated in FIG. 4, the line pressure LP itself is allowed to act on the auxiliary pressure valve V9 via an (additional) valve control line 44.

To limit the auxiliary pressure AP to a maximum level, e.g. a level that is maximally required for the operation of the auxiliary devices of the transmission 2, i.e. to limit the pressure in the valve control line 44, a pressure limiting valve 45 is preferably provided that connects the valve control line 44 to the auxiliary line 41. By means of this pressure limiting valve 45 the pressure in the valve control line 44 and thus also the auxiliary pressure AP are limited to a limit level, preferably in the range between 10 to 15 bar. To also limit the flow of fluid in the valve control line 44 a hydraulic restriction 46 is preferably provided therein.

The invention claimed is:

1. A hydraulic control system in a continuously variable transmission provided with a pump for the supply of hydraulic fluid, comprising:
   a main line;
   a main line pressure valve;
   an auxiliary line; and
   an auxiliary pressure valve, wherein
   the main line pressure valve is arranged to control a hydraulic pressure in the main line,
   the main line pressure valve is capable of discharging a surplus of the hydraulic fluid supplied by the pump into the auxiliary line,
   the auxiliary pressure valve is controllable whereby this auxiliary pressure valve is capable of varying hydraulic pressure in the auxiliary line and
   the auxiliary pressure valve is arranged to control the hydraulic pressure in the auxiliary line in dependency on the hydraulic pressure in the main line.

2. The hydraulic control system according to claim 1, wherein the auxiliary pressure valve is electronically controllable by means of an electromagnet or solenoid.

3. The hydraulic control system according to claim 1, wherein the auxiliary pressure valve is hydraulically controllable.

4. A hydraulic control system in a continuously variable transmission provided with a pump for the supply of hydraulic fluid, comprising:
   a main line;
   a main line pressure valve;
   an auxiliary line; and
   an auxiliary pressure valve, wherein
   the main line pressure valve is arranged to control a hydraulic pressure in the main line,
   the main line pressure valve is capable of discharging a surplus of the hydraulic fluid supplied by the pump into the auxiliary line,
   the auxiliary pressure valve is controllable whereby this auxiliary pressure valve is capable of varying hydraulic pressure in the auxiliary line,
   the auxiliary pressure valve is hydraulically controllable, and
   the auxiliary pressure valve is provided with a hydraulic connection line that provides a direct hydraulic connection to the main line.

5. The hydraulic control system according to claim 4, wherein in said hydraulic connection line a hydraulic restriction is provided.

6. The hydraulic control system according to claim 4, wherein, the hydraulic control system is further provided with a pressure limiting valve that is arranged to limit a hydraulic pressure in the valve control line of the auxiliary pressure valve.

7. The hydraulic control system according to claim 6, wherein, the pressure limiting valve is arranged to discharge hydraulic fluid from said hydraulic connection line to said auxiliary line.

8. The hydraulic control system according to claim 7, wherein the transmission comprises a hydraulically operated clutch and a hydraulically operated variator unit and in that the variator unit is supplied with hydraulic fluid from the main line and the clutch is supplied with hydraulic fluid from the auxiliary line.

9. The hydraulic control system according to claim 5, wherein, the hydraulic control system is further provided with a pressure limiting valve that is arranged to limit a hydraulic pressure in the hydraulic connection line of the auxiliary pressure valve.

10. The hydraulic control system according to claim 9, wherein, the pressure limiting valve is arranged to discharge hydraulic fluid from said valve control line to the said auxiliary line.

* * * * *